Nov. 8, 1949  M. E. FOSTER  2,487,325
TRAILER TRUCK AND TILT BED THEREFOR
Filed Dec. 22, 1947  3 Sheets-Sheet 2
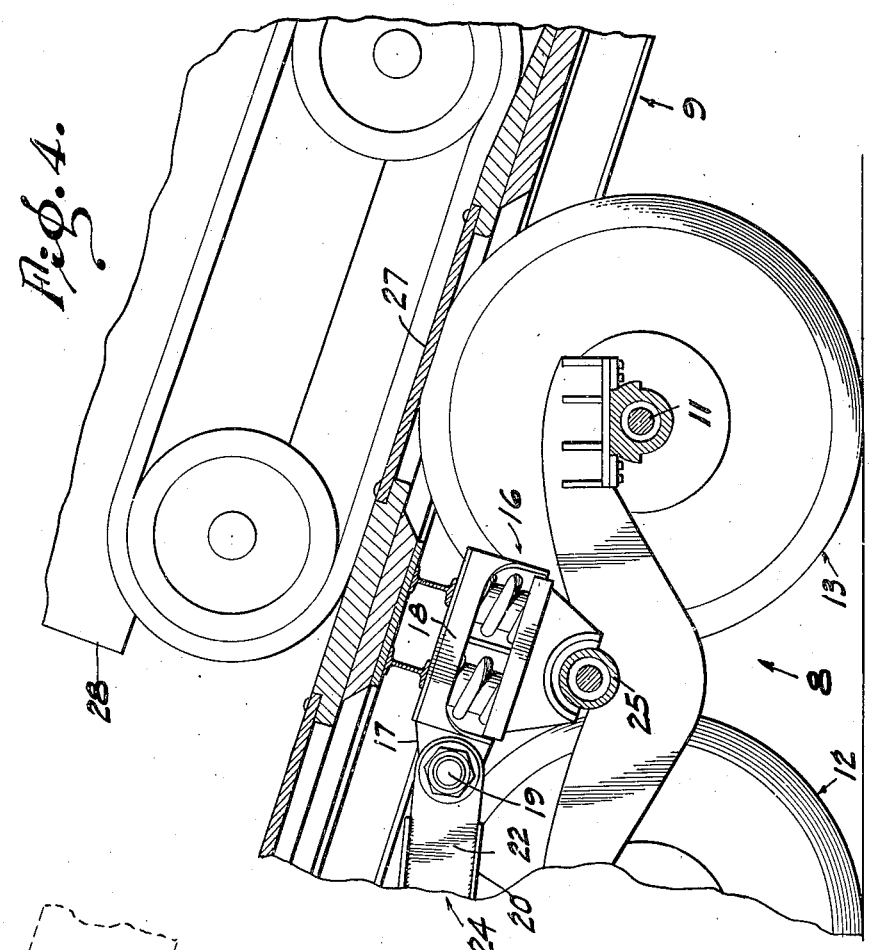
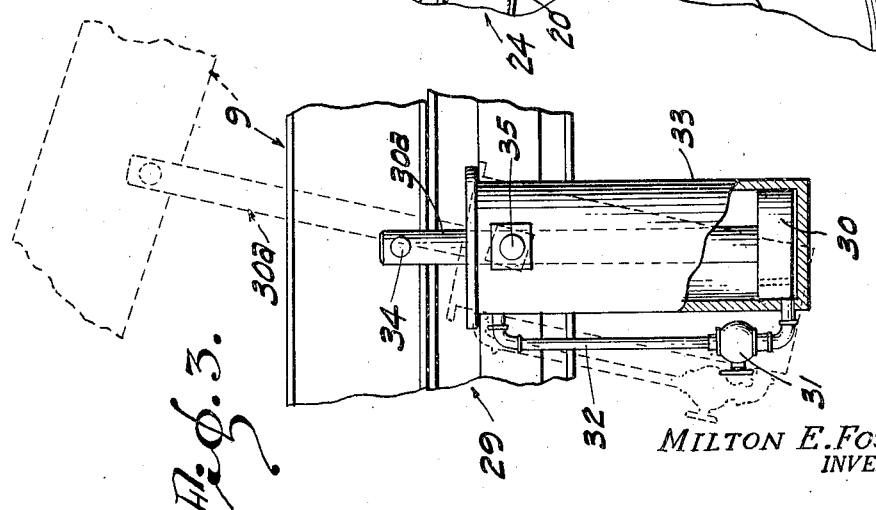
MILTON E. FOSTER,
INVENTOR.
BY
ATTORNEY

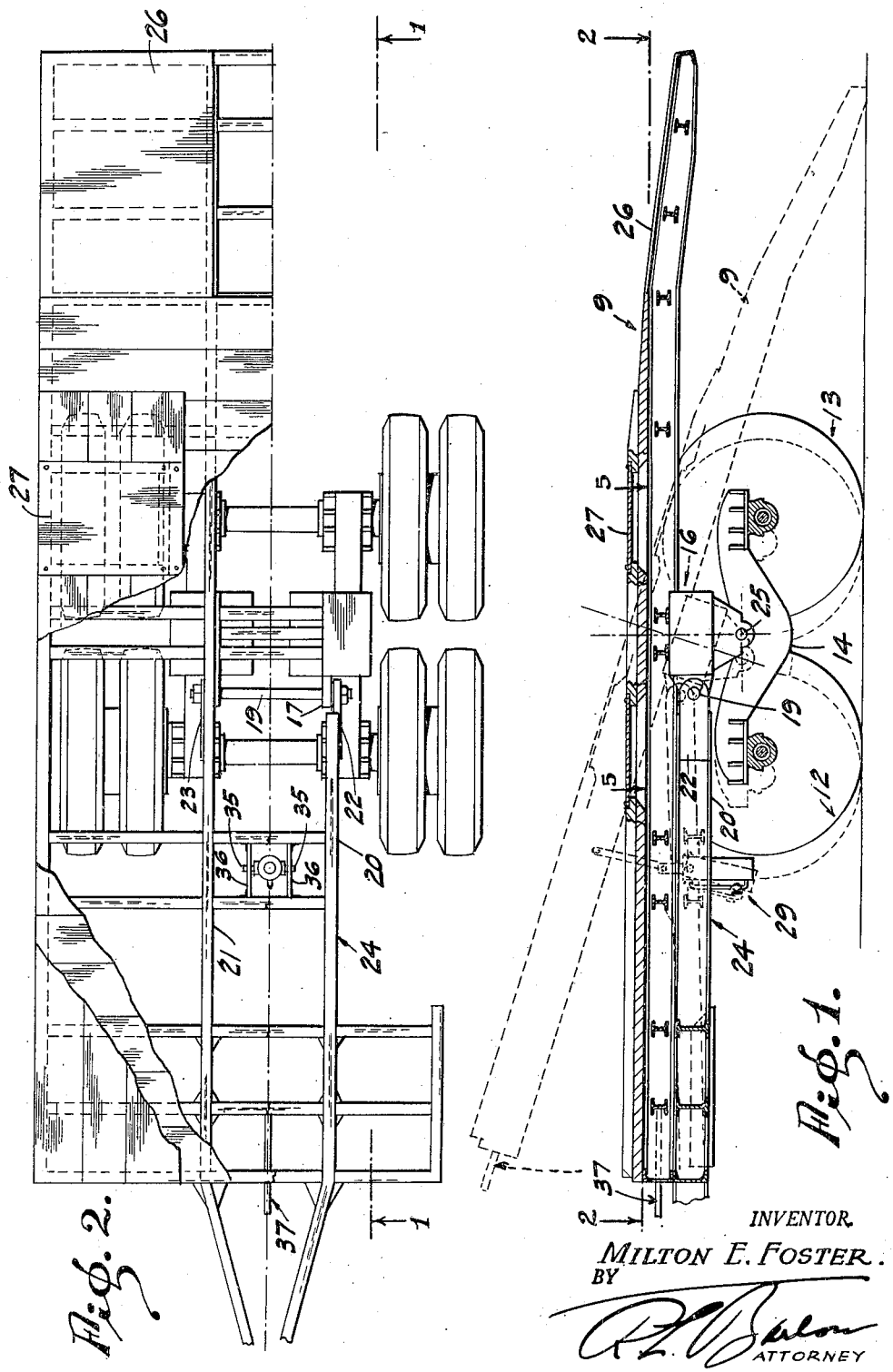

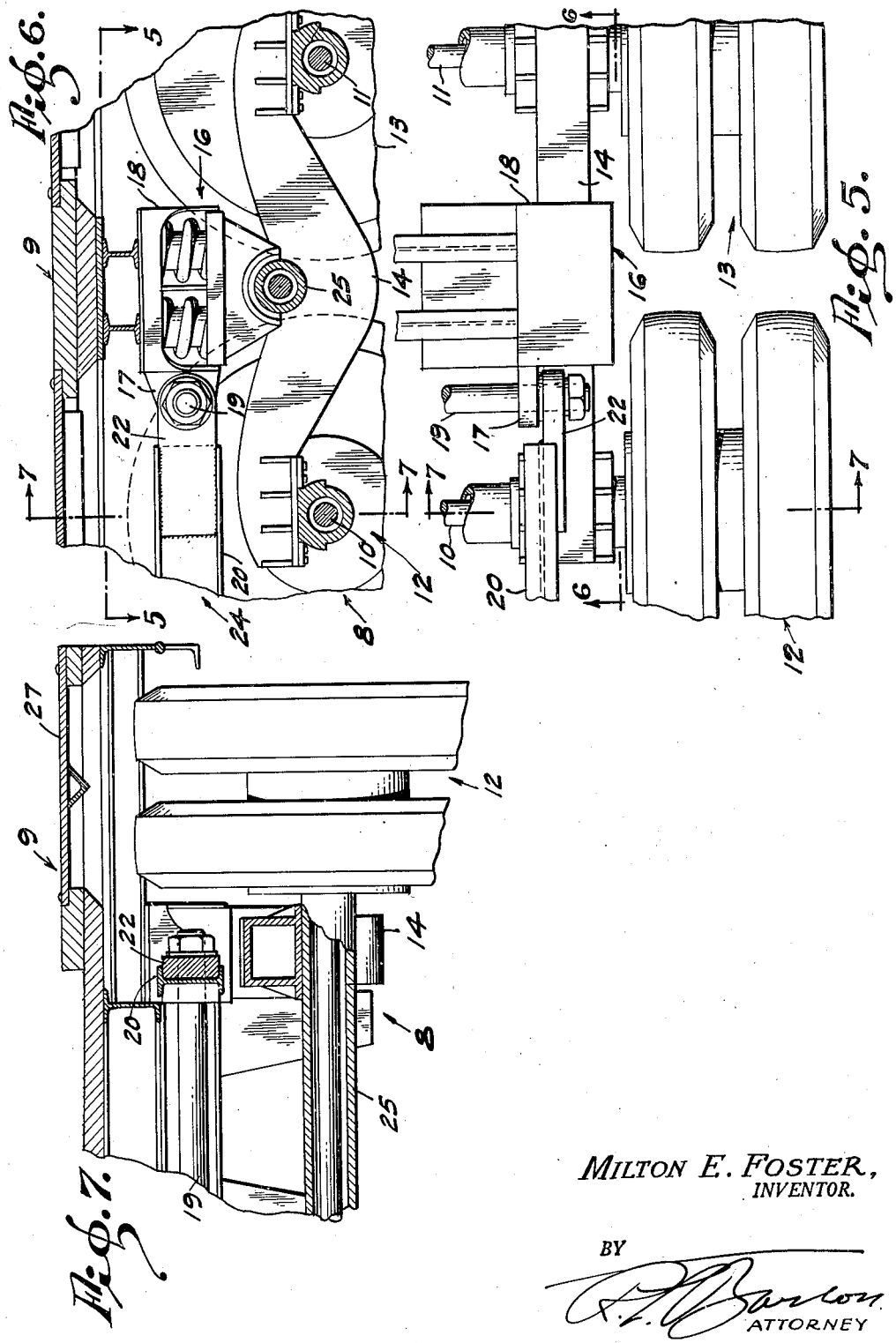

Patented Nov. 8, 1949

2,487,325

UNITED STATES PATENT OFFICE 2,487,325

TRAILER TRUCK AND TILT BED THEREFOR

Milton E. Foster, Los Angeles, Calif.

Application December 22, 1947, Serial No. 793,086

8 Claims. (Cl. 214—85)

This invention relates to new and useful improvements in trailer trucks and tilt beds therefor.

Heretofore, in so far as I have been able to ascertain, it has been the custom to attach to the trailer assembly a bed which is rockable upon a shaft which is located to the rear of the spring assembly, in such a manner that equipment such as heavy caterpillar tractors can be loaded onto the inclined platform and subsequently caused to assume a horizontal transporting position.

When the axis of the shaft upon which the trailer bed is tiltable is thus eccentrically positioned in relation to the dual sets of springs comprising the spring assembly, upon which the main load rests, during transit, numerous mechanical disadvantages result. For example, the load is not directly assumed by the springs and consequently strain and unnecessary wear is placed upon the parts which indirectly transmit the load thereto.

Furthermore, the use of auxiliary shafting to tiltably mount the bed on and the added reinforcement required to adequately transmit the load to the main springs materially adds to the weight causing the sacrifice of cargo otherwise transportable, because of State laws requiring drivers to keep their loads within stated limitations. Then too, due to the size, strength and weight required to haul heavy equipment on these types of trailers renders them inoperative from their normal position to loading position by one man.

Important objects of the invention are to so construct a tilt bed trailer as to overcome these disadvantages; by providing a spring borne tilt bed wherein the load is directly transmitted to the main supporting springs and absorbed by them without the latter being canted; by providing a means for so hinging the tilt bed as to utilize the tires on the rear wheels of the tandem suspension for cribbing under the rear section of the tilt bed to reduce the span between the ground supported end and center of its oscillation while at the same time utilizing the weight of the imposed load to create a friction brake to prevent movement of the trailer during the loading operation; by providing and utilizing the trunnion shaft on the tandem axle suspension of various standard makes as a hinge or fulcrum on which to tilt the upper bed or tilt bed, thus assuring proper distribution of imposed loads regardless of the tilt bed's position; by providing means in combination with the tractor's drawbar structure whereby the movement of imposed loads on the trailer platform can be hydraulically retarded and absorbed by the drawbar structure during the loading operation; and by providing a unit which can be operated by one man and can be tilted into loading position and level or traveling position by the application of a man's weight to the extreme ends of the tilt bed.

Other objects, advantages and features of invention will hereinafter appear.

Referring to the drawings, wherein is shown a preferred embodiment of the invention, Fig. 1 is a longitudinal section taken on line 1—1 of Fig. 2 showing the trailer attached to the drawbar structure of a tractor body and includes the oil control cylinder. In said view full and dotted line positions of the trailer are shown, the dotted line showing indicating the position of the parts in loading.

Fig. 2 is a fragmentary plan view taken on line 2—2 of Fig. 1.

Fig. 3 is an enlarged fragmentary side elevation of the hydraulic tilt control cylinder, the dotted line showing indicating the relation of the parts in the loading position.

Fig. 4 is an enlarged fragmentary vertical section with the tilt bed in the loading position and a caterpillar tractor imposed thereon illustrating the manner in which the load is directly assumed by the main spring assembly and wheels.

Fig. 5 is a fragmentary plan view, indicated by line 5—5 on Figs. 1 and 6, showing the manner in which the trailer is pivotally connected to the drawbar structure of a tractor body.

Fig. 6 is a longitudinal vertical section on line 6—6 of Fig. 5.

Fig. 7 is a fragmentary vertical section on line 7—7 of Figs. 5 and 6.

Referring in detail to the drawings, therein is shown a conventional running gear 8 supporting a tilt bed 9. The running gear 8 comprises such main parts as the front and rear axles 10 and 11, a pair of dual wheels 12 mounted on the front axles 10, a pair of dual wheels 13 mounted on the rear axles, the walking beams 14 and the spring box assembly 16.

The conventional running gear is modified to the extent that an ear 17 is welded to each spring box 18 at the front end thereof and these ears are apertured to accommodate a bolt 19 whereby such ears and in turn the running gear is hingedly connected to the beams 20 and 21 of a tractor body, connections with said beams being made through the medium of apertured lugs 22 and 23 welded to the webs of the respective beams through which the hinge bolt 19 extends.

The spring box assembly 16 is connected to the walking beams through the medium of the trunnion-mounted shaft 25 on which the spring boxes are free to turn, as shown by the tilted position of the bed or cargo deck in Figs. 1 and 4, and the trailer axles 10 and 11 are rigidly mounted to said walking beams.

In the tilted position of the deck 9 in Fig. 4 it will be seen that by the present method of hinging the trailer springs remain at a right angle to the tilt deck at all times. This feature assures the operator that the load imposed upon the trailer in tilt position will be properly distributed to the axles and wheel assembly without any canting action taking place. This spring suspension mechanism may be said to comprise a cradle like structure.

When the tilt deck 9 is tilted to loading position its degree of pitch ranges from a minimum of 10 degrees to a maximum of 15 degrees, depending on the diameter of the tires used.

The rear approach ramps 26, which are an integral part of the tilt deck, have a slightly greater pitch angle than the forward portion of the deck as shown in Fig. 1. This degree of pitch ranges from 3 degrees to 8 degrees or more than the angle above mentioned depending on the tire size used. The small loading angle is made possible by the forward motion of the axle assembly as shown in Fig. 1 when the bed is tilted into loading position.

The carry-back action of the wheels and the deck height of the trailer are so proportioned that when the deck is fully tilted the steel plates 27 at each side of the trailer deck presses against the tires of the pair of dual wheels 13 compressing them, which contact causes the plates 27 to act as friction brakes and at the same time forces the axles to their maximum forward dotted line position as shown in Fig. 1. The wheels 13 also perform the function of bolstering the rear half of the tilt bed and act as a cribbing in supporting extremely heavy loads as they are transported thereover like the caterpillar tractor 28 shown in Fig. 4.

Steel plates 27 form a part of the tilt deck and assume a contactual relation with the tires of the wheels 13 when tilted. These plates have a dual function in acting both as a brake and in forcing shaft 25 from the full line position to its maximum forward dotted line position as shown in Fig. 1.

The specific construction of the tilt bed 9 will not be described in detail since it is within the province of the designer to construct it in many ways and aside from what has already been said the right is reserved to modify and rearrange the parts whenever deemed necessary to diminish the weight or to provide additional strength for the ever-changing sizes of cargoes which are to be transported on or over such a tiltable deck.

A connection 37 is provided for detachably fastening the tilt bed 9 in its normal transporting position, said connection as shown comprises a pin a portion of which is connectable with the front end of the trailer bed and another portion of which is connectable with the tractor body wherebehind the trailer is trailed. Broadly speaking, this connection may be any one of several different kinds of conventional manual or automatic locking means.

The hydraulic tilt control mechanism 29 shown in Figs. 1, 2 and 3 is utilized for the purpose of cushioning the action of the tilt bed under such heavy loads as that shown in Fig. 4. In the absence of such a mechanism the action of the tilt bed would become so sudden that extreme danger would be encountered in loading and unloading equipment.

The hydraulic tilt control mechanism features a by-pass piston 30 which allows oil to pass from the upper chamber to the lower chamber and vice versa even though the valve 31 in the main by-pass pipe 32 is closed. This by-pass piston is a safety feature and assures the operator that he will not come too far forward or back on the tilt deck without movement of the deck taking place. When one man wishes to tilt the bed either up or down, the by-pass valve 31 is fully opened.

Piston 30 has an elongated stem 30a, a portion of which projects through and beyond the upper end of the piston cylinder 33 when the piston is fully retracted within said piston cylinder, such projecting end being pivotally connected by a pivot pin 34 to the tilt bed 9.

Cylinder 33 is provided with a pair of diametrically opposed spindles 35 whereby it is swingably mounted between supports 36, said supports providing a bearing for said spindles so that during the raising and lowering of the tilt bed the cylinder swings through a slight arc about the spindles' axes.

In the operation of loading, the operator releases the brakes on the trailer and applies the brakes on the tractor body or truck as the case may be. The connection 37 is then operated so that the bed 9 is free to tilt. Next the valve 31 on the tilt control cylinder 33 is fully opened leaving the liquid free to by-pass through the aperture in the piston from the upper part of the cylinder to the lower part thereof and through the by-pass pipe 32. Operator then walks to the extreme rear of the tilt deck, causing the latter to tilt from the full line position shown in Fig. 1 to the dotted or loading position shown therein. Valve 31 is then closed sufficiently to accommodate the load to which it will be subjected. Proper adjustment will result in movement of the tilt deck immediately after the load comes forward of its hinge points. Equipment is loaded onto the tilt deck as far forward as length of the deck will permit. As soon as the deck comes into its horizontal position it is manually locked. The equipment is now ready to be chained to the tilt deck for transportation.

In unloading the chained-down equipment is freed, brakes on trailer are released and truck brakes are fully applied. Then the connection or lock 37 is operated leaving the deck free to tilt. The valve 31 is checked for the same position as that used for loading. Equipment is then moved toward the rear of the tilt deck until the latter begins to tilt toward the ground and is finally removed from the trailer. Again the valve 31 is fully opened and by the application of the operator's weight at the extreme forward end of the deck the latter is forced to level position and locked.

The action which takes place as a result of the tilting operation and contact of the deck with the wheels will be readily understood from the detailed description.

What is claimed is:

1. A trailer having a longitudinally extending deck, a shaft whereon said deck is supported and whereabout said deck is rockable in the direction of its length from a horizontal position to an inclined loading position, in which inclined loading position one end of the deck rests upon the ground, and ground supported wheels whereon said shaft and in turn the trailer is mounted for transportation, a portion of said deck intermediate its ground-supported end and said shaft being adapted to rest against said wheels in said inclined loading position.

2. A trailer detachably connected to a drawbar structure of a tractor body, a forwardly and rearwardly wheel-supported truck, a trunnion-mounted shaft carried by said truck whereon the bed of said trailer is mounted in such a manner so as to be moved from a load-carrying position to an inclined loading position wherein the rear end of the bed rests on the ground and a portion thereof intermediate said ground-supported end and said trunnion-shaft rests against said rearward wheels of said truck, means carried by said drawbar structure and operatively connected to the front end of said bed to retard its downward descent when a load is imposed upon such end, and means to connect the front end of the trailer bed to said tractor body when such bed has reached the end of its downward travel.

3. A trailer, a longitudinally extending deck for said trailer, a rolling support comprising wheels provided with compressible tires for said trailer whereon said deck is mounted, and a fulcrum shaft carried by said rolling support, said deck being rockable lengthwise on said fulcrum shaft from a horizontal to an inclined position one end of said deck rests upon the ground and a portion thereof intermediate said ground-supported end and said shaft is adapted to rest against said compressible tires against said rolling support.

4. A trailer connectable to a tractor body provided with braking means and a drawbar structure, a longitudinally extending floor for said trailer, a wheeled support for said trailer whereon said floor is mounted, fulcrum means carried by said wheeled support, a spring supported cradle supported rockably upon said fulcrum means, said floor of said trailer being operatively connected to said cradle in such a manner so that when said floor is tilted about the axis of said fulcrum means from a load-carrying position to an inclined loading position one end of said floor rests on the ground and a portion of the floor intermediate its ground supported end and said fulcrum means rests against said wheeled support.

5. The subject matter of claim 4 and means pivotally connecting said cradle to the tractor's drawbar structure, said pivotal means when the brakes of said tractor are fully applied being movable in an upward direction in relation to the axis of said fulcrum means as the ground supported end of said floor approaches its ground supporting position, said wheeled support in turn simultaneously moving forwardly as a result of the upward movement of said pivotal means, said upward motion of said pivotal means and said forward motion of said wheeled support cocking the drawbar structure in relation to said trailer as a whole whereby to in cooperation with the floor resting against said wheeled support further lock the trailer and tractor against forward motion while an object is being propelled up the ramp afforded by said tiltable floor.

6. A trailer having a longitudinally extending bed tiltable from a horizontal position to an inclined position and vice versa, a truck having longitudinally spaced apart axles with ground wheels mounted thereon, walking beams connecting said axles in tandem, a trunnion-mounted shaft carried by said walking beams, and spring supported mechanism rockably mounted upon said trunnion-mounted shaft and connected to said bed for tilting the latter as aforesaid, said bed when in the inclined position having one end resting on the ground and a portion thereof intermediate the ground supported end and said trunnion-mounted shaft resting against the rearmost of said ground wheels.

7. The subject matter of claim 6 and means to maintain said bed in its various adjusted positions in a right angular relationship with the springs of said spring supported mechanism.

8. The subject matter of claim 6 and means carried by said spring supported mechanism for pivotally connecting said trailer to a drawbar structure.

MILTON E. FOSTER.

REFERENCES CITED

The following references are of record in the file of this patent:

UNITED STATES PATENTS

| Number | Name | Date |
|---|---|---|
| 1,767,470 | Mitchell | June 24, 1930 |
| 2,288,246 | Kuester | June 30, 1942 |
| 2,408,862 | Lisota | Oct. 8, 1946 |
| 2,452,681 | Rehberger | Nov. 2, 1948 |